(12) United States Patent
Wienand et al.

(10) Patent No.: US 6,622,704 B2
(45) Date of Patent: Sep. 23, 2003

(54) DEVICE FOR EXHAUST GAS RECIRCULATION INTO THE AIR INTAKE REGION OF MOTOR VEHICLE INTERNAL COMBUSTION ENGINES

(75) Inventors: Karlheinz Wienand, Aschaffenburg (DE); Matthias Muziol, Seligenstadt (DE); Karlheinz Ullrich, Grossumstadt (DE); Gerhard Damaschke, Flörsheim (DE)

(73) Assignee: Heraeus Electro-Nite International N.V., Houthalem (BE)

( * ) Notice: Subject to any disclaimer, the term of this patent is extended or adjusted under 35 U.S.C. 154(b) by 0 days.

(21) Appl. No.: 10/322,317

(22) Filed: Dec. 17, 2002

(65) Prior Publication Data

US 2003/0101974 A1 Jun. 5, 2003

Related U.S. Application Data

(62) Division of application No. 09/927,846, filed on Aug. 10, 2001, now Pat. No. 6,502,556, which is a continuation of application No. PCT/EP00/12363, filed on Dec. 8, 2000.

(30) Foreign Application Priority Data

Dec. 10, 1999 (DE) .......................................... 199 59 854

(51) Int. Cl.$^7$ ............................................... F02M 51/00
(52) U.S. Cl. ............. 123/478; 123/568.12; 123/568.21; 123/568.26
(58) Field of Search ....................... 123/568.12, 568.21, 123/568.26, 472, 434, 568.11, 478

(56) References Cited

U.S. PATENT DOCUMENTS

| 433,666 | A | | 8/1890 | Webb |
| 4,177,777 | A | | 12/1979 | Maruyama et al. |
| 4,318,385 | A | | 3/1982 | Yamaguchi |
| 4,433,666 | A | * | 2/1984 | Masaki et al. ......... 123/568.22 |
| 4,462,376 | A | | 7/1984 | Ripper et al. |
| 6,079,265 | A | | 6/2000 | Wienand et al. |
| 6,095,123 | A | | 8/2000 | Kotwicki et al. |

FOREIGN PATENT DOCUMENTS

| DE | 2 235 568 A1 | 1/1974 |
| DE | 42 11 851 C2 | 9/1994 |
| EP | 0 810 361 A1 | 12/1997 |
| JP | 06074100 A | 3/1994 |

OTHER PUBLICATIONS

R. Pischinger et al., "Fundamental Investigations Concerning Exhaust Gas Recirculation In Heavy Duty Diesel Engines", *Grundsatzuntersuchungen zur Abgasrückführung bei NFZ–Motoren*, pp. 236–256, (1995).

* cited by examiner

Primary Examiner—Bibhu Mohanty
(74) Attorney, Agent, or Firm—Akin Gump Strauss Hauer & Feld, L.L.P.

(57) ABSTRACT

For reduction of toxic components in exhaust gases of internal combustion engines, particularly of nitrogen oxides in motor vehicles, a portion of the exhaust gases, essentially operating as inert gases, are recirculated into the combustion chamber of the engine for the purpose of reducing the peak combustion temperature. In the air intake region the engine is fed an adjustable mixture of partially recirculated exhaust gas and air, wherein the mass of in-flowing air and the mass of exhaust gas recirculated from the engine following its cleaning and cooling are fed respectively to its own flow rate sensor. From the determined mass flow amounts of in-flowing air and recirculated exhaust gas, an actual value signal is formed and compared with a target value signal dependent upon the respective performance specification. A regulation deviation of the actual value signal leads to an adjustment signal, which intervenes into the exhaust gas recirculation for the purpose of adjusting the amount recirculated.

11 Claims, 4 Drawing Sheets

DEVICE FOR EXHAUST GAS RECIRCULATION INTO THE AIR INTAKE REGION OF MOTOR VEHICLE INTERNAL COMBUSTION ENGINES

CROSS-REFERENCE TO RELATED APPLICATIONS

This application a divisional of U.S. patent application Ser. No. 09/927,846, filed on Aug. 10, 2001, now U.S. Pat. No. 6,502,556, which is a continuation of International Application No. PCT/EP00/12363, filed Dec. 8, 2000, the disclosures of which are incorporated herein by reference.

BACKGROUND OF THE INVENTION

The invention is directed to a process for (partial) exhaust gas recirculation into an air intake region of a motor vehicle internal combustion engine in which a mixture of exhaust gas and in-flowing air, adjustable by a regulator, is fed to the engine. The mass of air is determined by a flow rate sensor, and a fuel amount is fed as a function of the air mass through-flow rate, taking into consideration a performance specification signal. The invention also includes a device for carrying out the process.

From German Patent DE 42 11 851 C2 a process is known for determining cylinder air flow rate in connection with an electronic engine control system of an internal combustion engine with an exhaust gas recirculation device. It relates to a process for controlling an internal combustion engine with an exhaust gas recirculation (AGR) system for regulating toxic emissions, wherein an exact value for the aspirated air flow rate (cylinder air flow rate) of the gas is determined as it is actually introduced into an engine cylinder during the active state of the AGR system. This is necessary for good engine control. Furthermore, a process is described for the exact determination of the amount of fuel to be injected, wherein the transport delay of the fuel is considered in the suction nozzles.

For the purpose of control or regulation of toxic gas emissions and to save fuel, internal combustion engines for motor vehicles use electronic control systems, which hold the air/fuel mixing ratio to a target value essentially in the entire engine operation region. In order to control the air/fuel mixing ratio with great accuracy, the cylinder air flow rate of the gas actually sucked into an engine cylinder is determined exactly, and the requisite fuel flow is determined on the basis of the values for the aspirated air flow rate and the target air/fuel ratio. The relatively complex determination of the recirculated exhaust gas flow rate appears problematic here.

Furthermore, eliminating toxic components in exhaust gases of internal combustion engines, in order to keep the ambient air as clean as possible, is known from German published patent application DE-OS 22 35 568. The toxic components consist essentially of carbon monoxide and combusted hydrocarbons and nitrogen oxides. For eliminating carbon monoxide and combusted hydrocarbons, thermal and catalytic afterburning processes were developed. Furthermore, the possibility is pursued of achieving a reduction of nitrogen oxide emissions by recirculation of a portion of the combustion exhaust gases into the combustion chamber (exhaust gas recirculation). By recirculating a portion of the exhaust gases consisting essentially of inert gases, the peak combustion temperature in the main combustion chamber is so reduced that the emission of nitrogen oxides is decisively reduced. For exhaust gas recirculation, generally up to 15 percent of the total amount of exhaust gas is withdrawn, which is taken at any point in the exhaust gas conduit.

From U.S. Pat. No. 4,462,376 a process is known for determining, and regulating an exhaust gas recirculation rate in internal combustion engines (diesel engines), wherein an adjustment link in the exhaust gas recirculation chain is adjusted by a regulator, in order to obtain a precise regulation of the amount of exhaust gas which is fed into the air intake zone of the engine. The regulator is provided with the exhaust gas temperature, which at a specified time serves as a load signal for the engine. The reference signal of the regulator is then either a current value of the exhaust gas recirculation rate, which is determined by devices for effective temperature measurement in the intake region of the engine, or a specified temperature difference is determined, which is determined by devices for measuring the aspirated air amount at a given time. The problem is seen here that an optimal adjustment of the operating point, which would lead to a low impact on the environment, is not possible without further measures.

BRIEF SUMMARY OF THE INVENTION

The invention has for an object the attainment, from determined parameters of the motor vehicle internal combustion engine, of an optimization of the engine operation with regard to efficiency and low environmental impact, wherein the parameters should be determined in the simplest manner possible.

The objective is accomplished according to the process of the invention in that, exhaust gas exiting the engine is fed to a further flow rate sensor wherein, from the determined flow rates of aspirated air and recirculated exhaust gas, an actual value signal (X, X1, X2) is formed and compared with a target value signal (W) for an-optimal operating point of the engine, wherein a regulation deviation of the actual value signal leads to an adjustment signal which intervenes in the exhaust gas recirculation with the aid of an adjustment member.

In an advantageous embodiment of the process, exhaust gas exiting from the engine is cleaned of combustion products before it is cooled. Furthermore, especially with larger engines (e.g., for trucks), a cooling of the exhaust gas is provided, preferably to a temperature in a range of about 70° C. to 300° C. With the aid of an adjustment signal (Y, Y1), at least one adjustment member in the exhaust gas recirculation is controlled, which is preferably constructed as a contollable valve.

In a preferred embodiment of the process, the target value signal (W) is derived from a performance specification signal (e.g., gas pedal) and at least one parameter of the engine. As a parameter, at least one signal is provided which is formed from the exhaust gas temperature or rotational speed, as well as the mass of flowing air. Here, at least one signal, as an engine parameter, is compared with a reference signal through difference value formation, wherein exceeding a specified difference value leads to an adjustment signal (Y, Y1, Y2).

While the adjustment signals Y, Y1 directly intervene in the exhaust gas recirculation, preferably by means of a controllable valve, adjustment signal Y2 acts upon an adjustment member, which is located in the intake region of the internal combustion engine, into which a mixture of in-flowing air and partially recirculated exhaust gas flows in.

Preferably, adjustment signal Y2 acts upon a compressor in the intake region of the internal combustion engine wherein, with the aid of adjustment signal Y2, the adjustment of the blade angles is undertaken according to the "principle of variable blade shape in compressors." It is, however, also possible to have adjustment signal Y2 act upon a valve arrangement.

Preferably, the signals are converted into digital signals by means of an analog/digital converter and stored. Subsequently, a comparison of the stored values with digital reference values is undertaken.

In a preferred embodiment of the process, at least two heating resistors maintained at constant temperature in the flow rate sensor are successively flowed past for measuring the flowing mass of the exhaust gas. Here, the heating resistors are respectively flowed through by an adjustable current ($I_1$, $I_2$). From the strength of the currents ($I_1$, $I_2$) a signal is formed for the flowing mass and its direction.

Furthermore, in an advantageous embodiment of the process, the resulting flow of the flowing mass is determined from at least one pulsating current $I_1$ and $I_2$ by alternating multiplication of the current amplitudes with +1 and −1 and a subsequent difference value formation.

The objective is achieved according to a device of the invention for (partial) exhaust gas recirculation from an exit region of a motor vehicle internal combustion engine into an air intake region, in which a mixture of exhaust gas and in-flowing air, adjustable by regulation, is feedable into the engine. For determining the mass of air, a flow rate sensor is provided, and a fuel amount is adjustable as a function of the air mass through-flow rate, taking into consideration a performance specification signal. The exit region is connected with an intake region of the internal combustion engine via a flow channel for exhaust gas recirculation, which has at least one temperature sensor, a controllable valve as adjustment member, and an additional flow rate sensor.

In one embodiment of the device expedient for practice, an exhaust gas-cooling device is arranged in the flow conduit for the exhaust gas recirculation between the exit region and the additional flow rate sensor.

In a first advantageous embodiment of the device, the flow rate sensor has at least one temperature-dependent measurement resistor with rapid response time. Advantageously, the measurement resistor is constructed as a thin layer or thick layer element on the measuring technology basis of platinum or a platinum group metal.

In the first embodiment of the invention, the flow rate sensor has at least one measurement resistor and at least one heating resistor, wherein the resistors are constructed respectively in microsystem technology. The heating resistor(s) are provided for operation in the temperature range of about 350 to 750° C.

A flow rate sensor with a measurement resistor with short response time and a rapid microheater is known, for example, from European published patent application EP 0 964 230 A2.

In a second advantageous embodiment of the invention, the flow rate sensor has at least two rapid microheaters or heating resistors, which are operated at well-defined, fixed, excess temperatures, for example 450° C. and 550° C. The temperatures are selected such that depositing soot is constantly combusted by pyrolysis, and the microheaters consequently always remain clean. A rapid control electronics unit feeds the heater with current, such that its temperatures are held constant. The evaluation of the heating currents permits an unambiguous inference as to both the flow rate and the mass temperature. By using platinum heating elements, which can be manufactured in thin as well as thick layer technology, heating temperatures from 350° C. to 750° C. can be set using the well-defined resistance temperature characteristic curves of platinum.

A basic advantage of the second embodiment (two heating resistors) is that practically no sooting takes place on the heating resistors, so that they are always operated with optimal measurement characteristics.

The heating and measurement resistors are advantageously constructed in at least two strip conductors on a plate-like membrane, preferably of an electrically insulating and heat resistant material, such as ceramic.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
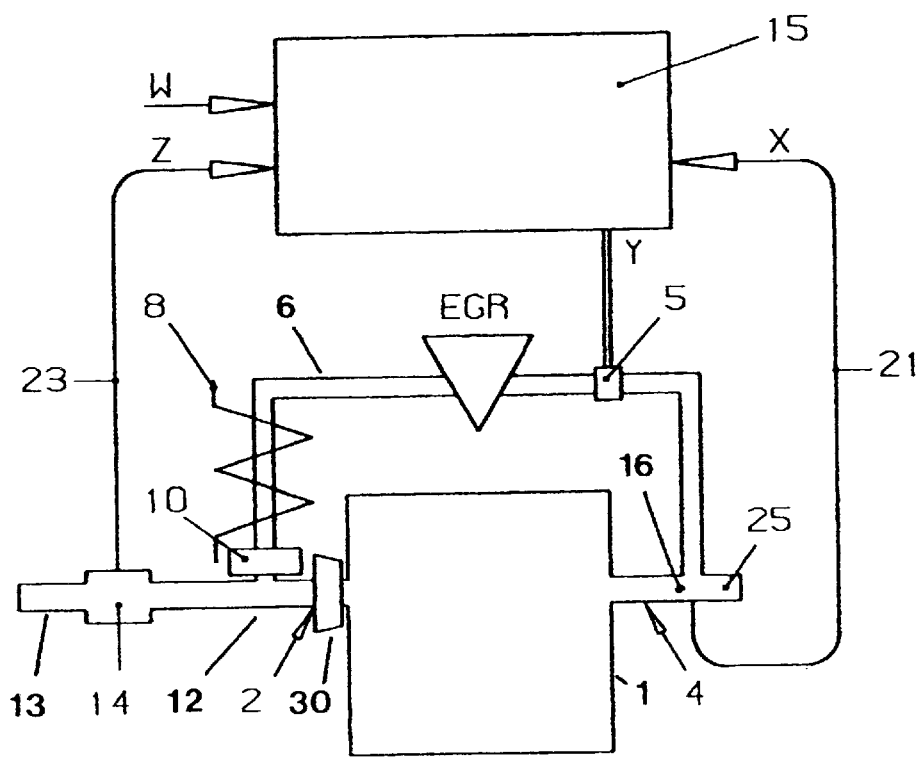
FIG. 1a is a schematic diagram illustrating the layout of a control circuit for an internal combustion engine with exhaust gas recirculation.

According to FIG. 1a the internal combustion engine 1 has an intake region 2 provided with charging for in-flowing air and recirculated exhaust gas. Furthermore, an exit region 4 is provided on the exhaust gas side of the engine, from which a portion of the exhaust gas is conducted into a flow channel 6 for exhaust gas recirculation, which is provided with a controllable valve 5, an optional exhaust gas cooling device 8, and an exhaust gas flow rate sensor 10. The flow rate sensor 10 measures the flow of recirculated exhaust gas. The controllable valve 5 serves to regulate the exhaust gas partial pressure for the purpose of adjusting a specific flow proportion between freshly in-flowing air and the amount of partially recirculated exhaust gas. The controllable valve 5 is controlled by a regulator 15 using an adjustment signal Y. The flow channel 6 for the exhaust gas recirculation ends in a manifold 12, constructed as a mixing chamber, of a fresh air inlet conduit 13 in the intake region 2 of the engine 1, wherein a flow rate sensor 14 is likewise provided for measurement of in-flowing fresh air.

The portion of exhaust gas diverted in the exit region 4 of the engine 1 for the recirculation to flow channel 6 consequently flows through valve 5, cooling device 8 (optional) and flow rate sensor 10 one after the other. The recirculated exhaust gas encounters the inflowing air in the manifold 12 of the fresh air inlet conduit 13, after the fresh air has passed through the flow rate sensor 14.

The mixture of in-flowing air and exhaust gas is fed to a charging device with compressor 30, which is preferably constructed as an exhaust gas turbo charger. The associated drive turbine in exit region 4 is not shown for purposes of a better overview.

The portion of exhaust gas not provided for recirculation reaches the outside though a conduit 25, and optionally a cleansing apparatus. The mean temperature of the exhaust gas lies at about 400° C. to 700° C.

Furthermore, in the exhaust gas exit region 4 a temperature sensor 16 can be located for measuring the exhaust gas temperature. The here symbolically-represented regulator 15 receives through conduit 21 a signal X1, corresponding to the exhaust gas temperature, and through conduit 23 a signal Z, corresponding to the amount of in-flowing fresh air measured by the flow rate sensor 14. Since this amount of in-flowing fresh air normally is not adjustable, this is represented by the symbol Z used in control technology for interference quantities.

Still further, a target value W is fed to the regulator via conduit 24 for regulating the signal X for the exhaust gas temperature from which, with the aid of the adjustment signal emitted by regulator 15, a specific ratio for the partial currents of the freshly-entering air mass via the flow-rate sensor 14 and the partial recirculation of the exhaust gas conducted via the flow rate sensor 10 can be adjusted. A particular embodiment of the flow rate sensor also delivers the exhaust gas temperature signal. But even the previous exhaust gas temperature measurement by temperature sensor 16 can be made available by mathematical model formation and can be omitted as a sensor.

Figure 1B:
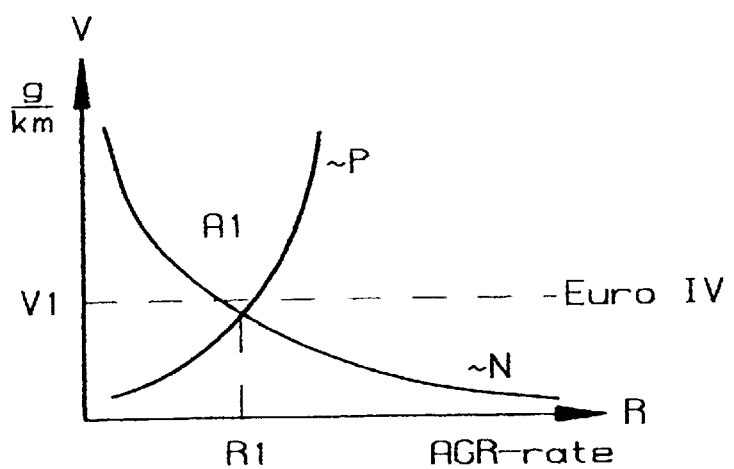
FIG. 1b is a graph showing a function of the quantity of combustion products V in g/lkm dependent on the exhaust gas recirculation rate R.

In FIG. 1b the amount V of the emitted toxic particles as well as the nitrogen oxides is schematically represented in g/km of driven distance, wherein a function is represented depending upon the recirculation rate R. It is recognizable on the basis of FIG. 1b that the amount of nitrogen oxides of curve N drops with increasing recirculation rate, while the emitted toxic particles of curve P increase. In the region of the diagram designated with point A1, the curve P of the particles and curve N of the nitrogen oxides cross in an optimal manner, so that Euro Standard IV can be met.

In accordance with the diagram in FIG. 1b, the adjustment signal Y is formed with the aid of the regulator 15 (FIG. 1a), such that both a minimal particle discharge in accordance with curve P and a minimal nitrogen oxide discharge in accordance with curve N of the diagram are set, in which the combustion products V1 in g/km are plotted against the exhaust gas recirculation rate R. The optimal operating point A1 lies at the point of intersection of the curves P and N at the coordinate values R1 and V1.

With the regulator represented in FIG. 1a, it is a matter of a simplified embodiment of the regulator, in which merely the exhaust gas temperature is fed to the regulator as regulated quantity or actual value signal X, wherein this quantity is compared with a performance specification as target value W (e.g., the position of a gas pedal in the vehicle). In the event of a regulation deviation, an adjustment signal Y acts upon the controllable valve 5, such that always only so much exhaust gas is recirculated through the flow channel 6 of the exhaust gas recirculation that the performance specification of target value W is maintained.

It is, however, also possible to use the regulator 15 as a so-called two quantity regulator wherein, for example, the exhaust gas temperature is fed to the regulator via conduit 21 as signal X1 and the rotational speed n of the internal combustion engine is fed via conduit 22 as signal X2. These two quantities X1 and X2 can be coupled with each other in accordance with FIG. 2 explained below.

Figure 1C:
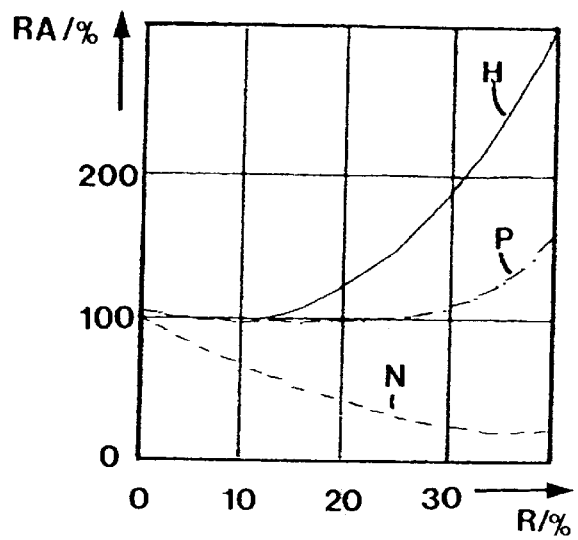
FIG. 1c is a graph showing, for better illustration of the optimization process, relative changes (RA) of the discharge of hydrocarbons (H), particles (P), and nitrogen oxides (N) as a function of exhaust gas recirculation rate (R), as it was discussed, for example, at the $16^{th}$ Vienna Motor Symposium from May 4 to 5, 2000.

From FIG. 1c it is recognizable that the hydrocarbons (HC), designated with"H" in the diagram, in the exhaust gas increase in the region of an exhaust gas recirculation rate R of 15 to 20%, starting from the region "of relative changes" RA between about 100% and 125%, while the exhaust gas particles, designated with"P", first increase beginning at an exhaust gas recirculation rate of more than 30%. In contrast, the nitrogen oxides (NOx) found in the exhaust gas, whose curve is designated with"N", are reduced from an initial value of RA of 100% at an exhaust gas recirculation rate of 0% down to a nitrogen oxide value in the range of about 50% at about 10% exhaust gas recirculation rate. The NOx value may be further decreased at an exhaust gas recirculation rate of 40% to a nitrogen oxide value of about 20%.

From the diagram of FIG. 1c it is evident that an optimization of the various exhaust gas parameters is possible for an exhaust gas recirculation rate in the range of about 15 to 30%.

The maximum values of Euro-Standard IV (exhaust gas) provided for exhaust gases in commercial vehicles beginning with an allowable overall weight of over 3.5 t are given in the following table:

| Commercial vehicles for allowable overall weight ≧ 3.5 t: | |
| --- | --- |
| Previous standard: | Euro IV standard |
| CO 4.0 g/kW/h | 4.0 g/kW/h |
| HC 1.1 g/kW/h | 0 g/kW/h |
| NOx 7.0 g/kW/h | 2.0 g/kW/h |
| PM* 0.15 g/kW/h | 0.08 g/kW/h |

*Particle Emissions of internal combustion engine

Figure 2:
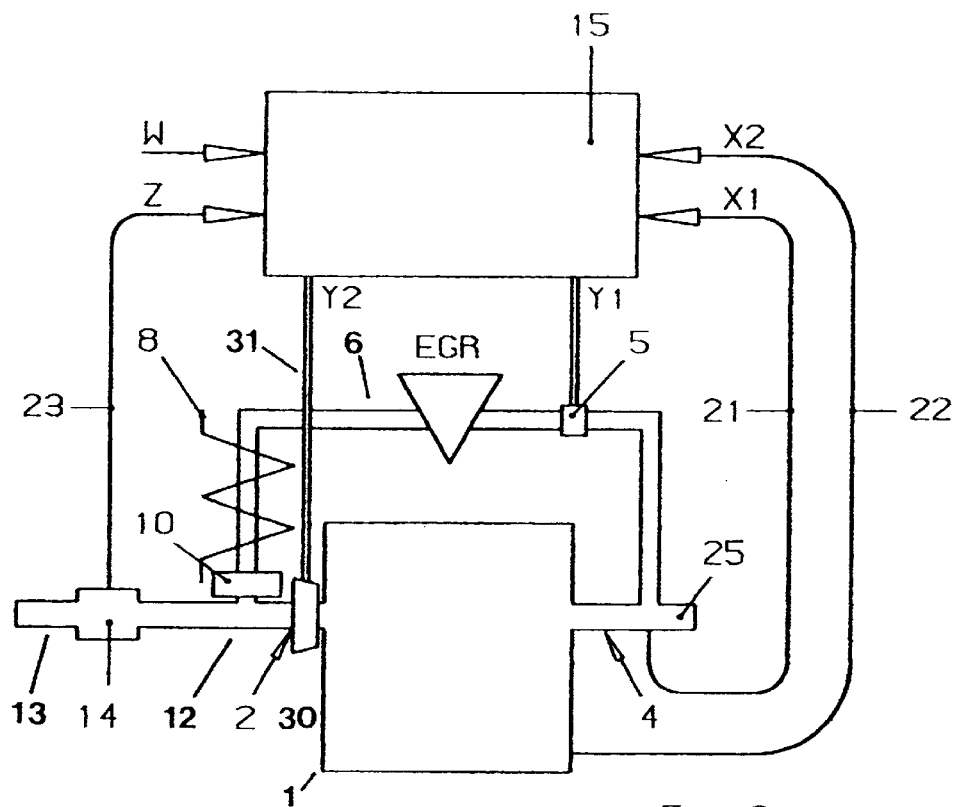
FIG. 2 is a schematic diagram of the layout of a control circuit for two controlled quantities.

According to FIG. 2 a two quantity regulator is provided where, similar to that of FIG. 1a, the exhaust gas temperature is fed as a controlled quantity X1 via conduit 21 to regulator 15, and in addition the rotational speed n is likewise fed to regulator 15 via conduit 22 as controlled quantity X2. With a first adjustment quantity Y1, a controllable valve 5 is regulated in the exhaust gas recirculation or in the flow channel 6, while adjustment signal Y2 of regulator 15 adjusts the adjustment angle of the compressor blades in the compressor 30 of the intake region, so that an optimal compromise between particle discharge and nitrogen oxide discharge is maintained in accordance with FIG. 1b at operating point A1. The adjustment signal Y2 is passed through conduit 31 to compressor 30. Here, it is important that both the recirculated amount of exhaust gas can be controlled by adjustment signal Y1 and the compressed amount of the in-flowing exhaust gas/air mixture can be regulated as exactly as possible, in order to set the optimal operating point in accordance with FIG. 1b.

Figure 3A:
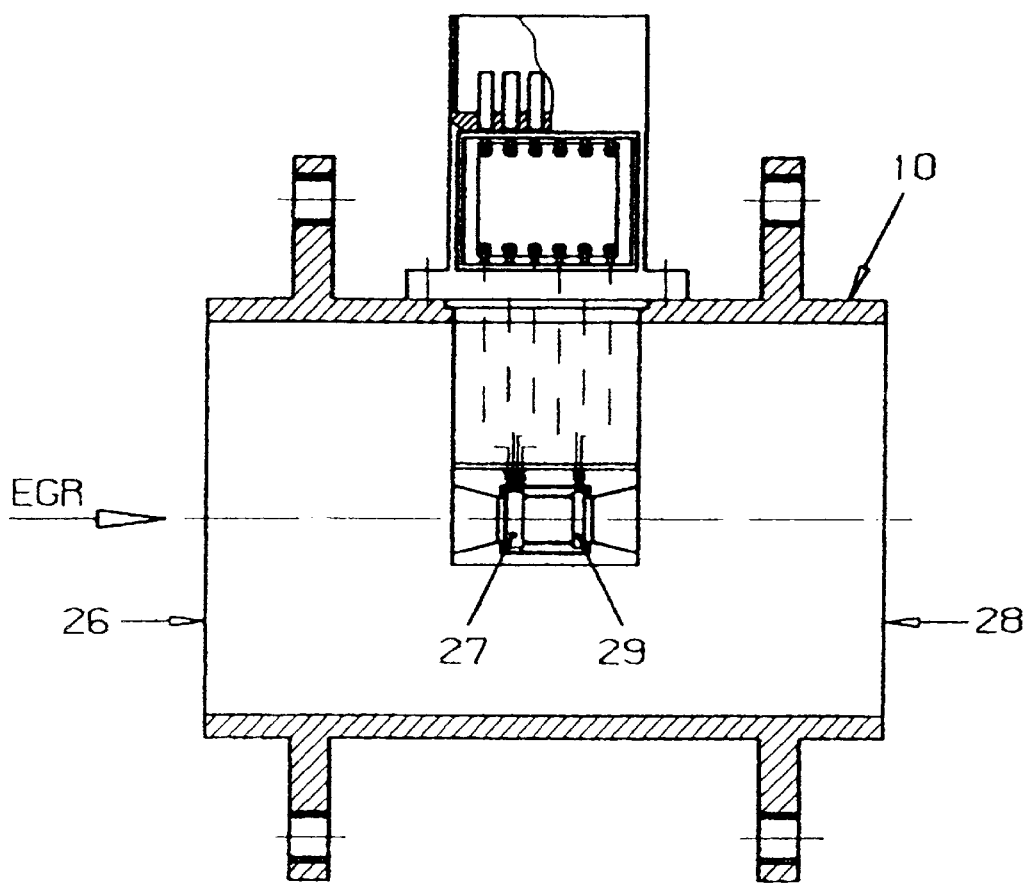
FIG. 3a is a longitudinal sectional view of a flow rate sensor for exhaust gas recirculation.

FIG. 3a shows in longitudinal section the flow rate sensor 10, wherein additional electrical terminal connectors are recognizable above the sensor housing, represented in longitudinal section. The intake region is provided with reference number 26, and the outlet region with reference number 28.

Figure 3B:
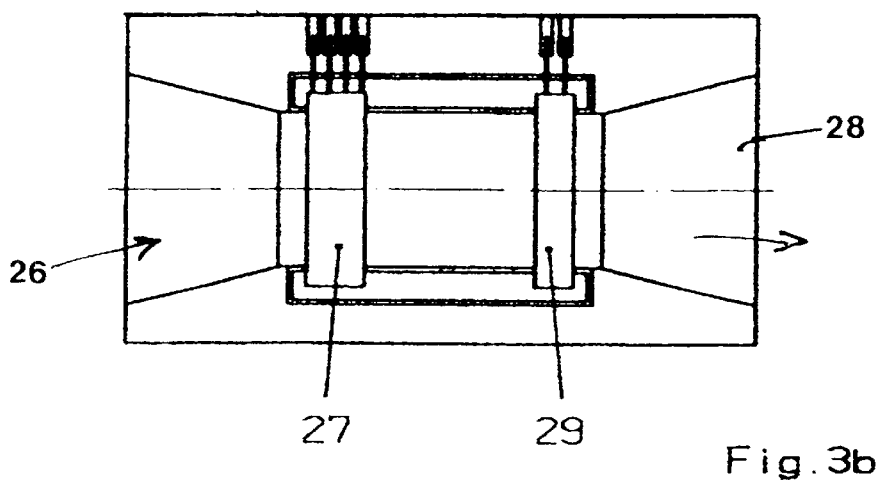
FIG. 3b is a view of the flow rate sensor itself.

In FIG. 3b the flow rate sensor 10 is represented in enlarged longitudinal view, wherein measurement element 27 is recognizable in intake region 26, while heating element 29 is recognizable in the outlet region 28. The function of such a flow rate sensor is known, for example, from DE 44 06 331.8 (U.S. Pat. No. 6,079,265).

Figure 3C:
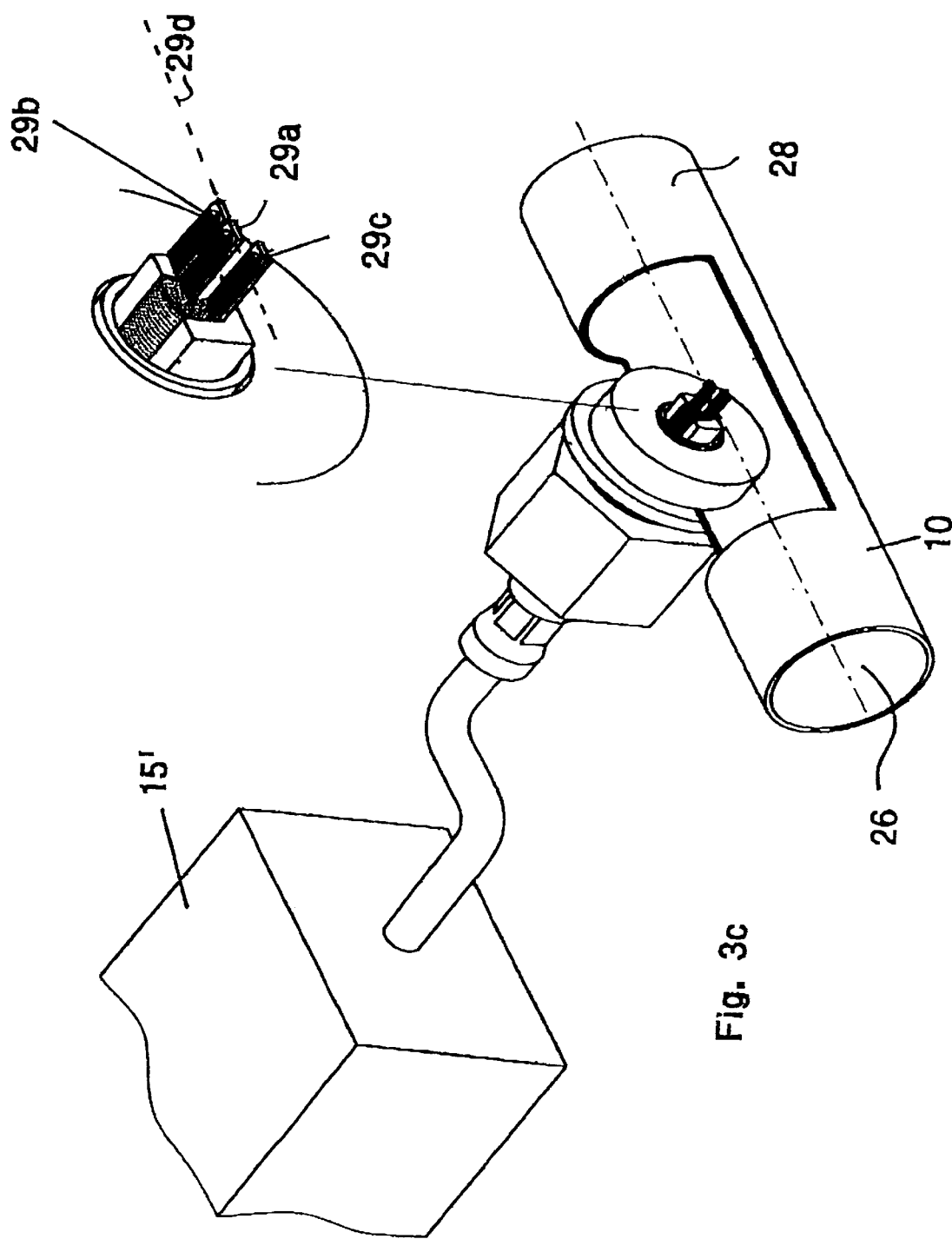
FIG. 3c is a perspective view of the flow channel arrangement for exhaust gas recirculation with an enlarged detail view of the measuring element itself.

In FIG. 3c the flow rate sensor 10 is represented in the cutout of the flow channel 6 according to the two or multiple heater principle. In this Figure two heating elements 29a, 29b are recognizable as microheaters. Both heating elements 29a and 29b are arranged in series in order to obtain a signal of the direction of the fluid motion in the flow rate sensor 10 (Double heater principle). Thus, it is possible to consider an additional backward movement of the flow from the outlet 28 to the intake region 26 in the case of a pulsation of the mixture of exhaust gas and in-flowing air mass. The accompanying temperature sensor 29c is arranged beyond the streamline 29d formed by the two heating elements 29a and 29b; thus, both heating elements 29a, 29b have no effect on the temperature sensor 29c. The associated regulator is constructed as part of the motor control electronics, fragmentally represented, which is here provided with reference number 15'.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for exhaust gas recirculation from an outlet region (4) of a motor vehicle internal combustion engine (1) into an air intake region (2), comprising a regulator (15) for adjusting a mixture of exhaust gas and in-flowing air mass feedable to the engine, a first flow rate sensor (14) for determining the mass of the in-flowing air mass, and a fuel feed for introducing to the engine an amount of fuel adjustable as a function of the air mass in-flow rate taking a performance specification signal into consideration, wherein the outlet region (4) is connected with the intake region (2) of the internal combustion engine (1) via a flow channel (6) for the exhaust gas recirculation, the flow channel (6) having at least one temperature sensor (16), one controllable valve (5) as an adjustment member, and a second flow rate sensor (10).

2. The device according to claim 1, wherein an exhaust gas cooling device is arranged between the outlet region (4) and the second flow rate sensor (10).

3. The device according to claim 1, wherein the second flow rate sensor (10) has at least one temperature-dependent measurement resistor with rapid response time.

4. The device according to claim 3, wherein the measurement resistor is constructed as one of a platinum thin layer element and a platinum thick layer element.

5. The device according to claim 1, wherein the second flow rate sensor (10) has at least two heating resistors and/or one measurement resistor with at least one heating resistor which are respectively constructed in microsystem technology.

6. The device according to claim 5, wherein the heating resistors are provided for operation in a temperature range of about 350 to 750° C.

7. The device according to claim 1, wherein at least two heating resistors and the temperature sensor are provided for determining the direction of flow.

8. The device according to claim 1, wherein at least two resistance strips of heating and/or measurement resistors are constructed respectively on a plate-like membrane.

9. The device according to claim 1, wherein at least two heating resistors are arranged at a specified spacing along a direction of flow in the second flow rate sensor.

10. The device according to claim 5, wherein respectively one alternating current flowing through one of the heating resistors is feedable to a comparator as a pulsating flow signal.

11. The device according to claim 10, wherein the comparator is connected with an amplifier for emitting a signal about intensity and resulting direction of the flowing mass.

* * * * *